United States Patent
Schamp

(10) Patent No.: US 10,181,085 B2
(45) Date of Patent: Jan. 15, 2019

(54) AUGMENTED OBJECT DETECTION USING STRUCTURED LIGHT

(71) Applicant: TRW AUTOMOTIVE U.S. LLC, Livonia, MI (US)

(72) Inventor: Gregory G. Schamp, South Lyon, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 15/518,866

(22) PCT Filed: Nov. 5, 2015

(86) PCT No.: PCT/US2015/059211
§ 371 (c)(1),
(2) Date: Apr. 13, 2017

(87) PCT Pub. No.: WO2016/073699
PCT Pub. Date: May 12, 2016

(65) Prior Publication Data
US 2017/0236014 A1    Aug. 17, 2017

Related U.S. Application Data

(60) Provisional application No. 62/075,350, filed on Nov. 5, 2014.

(51) Int. Cl.
*G06K 9/00* (2006.01)
*G01C 11/02* (2006.01)
(Continued)

(52) U.S. Cl.
CPC .......... *G06K 9/00805* (2013.01); *B60R 1/002* (2013.01); *G01B 11/026* (2013.01);
(Continued)

(58) Field of Classification Search
None
See application file for complete search history.

(56) References Cited

U.S. PATENT DOCUMENTS 4,954,962 A * 9/1990 Evans, Jr. ............ G01C 21/00
                                                          180/169
7,538,864 B2   5/2009 Golab et al.
(Continued)

FOREIGN PATENT DOCUMENTS

DE   19730414      1/1999
WO   2009063087    5/2009

OTHER PUBLICATIONS

PCT/US2015/059211 International Search Report and Written Opinion, completed Dec. 30, 2015.

*Primary Examiner* — Delomia L Gilliard
(74) *Attorney, Agent, or Firm* — Tarolli, Sundheim, Covell & Tummino LLP

(57) ABSTRACT

Systems and methods are provided for imaging a region of interest. A structured light source is configured to provide a substantially two-dimensional light curtain within a field of view of the camera formed by at least one projected laser beam at a wavelength detectable by the camera. An image analysis component is configured to detect objects within the region of interest from at least a position of the at least one projected laser beam within the image.

18 Claims, 2 Drawing Sheets

(51) Int. Cl.
| | |
|---|---|
| *G01S 17/46* | (2006.01) |
| *G01S 17/93* | (2006.01) |
| *G01B 11/02* | (2006.01) |
| *G06T 7/11* | (2017.01) |
| *B60R 1/00* | (2006.01) |
| *G01B 11/14* | (2006.01) |
| *G01V 8/10* | (2006.01) |
| *H04N 5/225* | (2006.01) |
| *H04N 7/18* | (2006.01) |

(52) U.S. Cl.
CPC ............ *G01B 11/14* (2013.01); *G01C 11/025* (2013.01); *G01S 17/46* (2013.01); *G01S 17/936* (2013.01); *G01V 8/10* (2013.01); *G06T 7/11* (2017.01); *H04N 5/2256* (2013.01); *H04N 7/183* (2013.01); *B60R 2300/202* (2013.01); *B60R 2300/802* (2013.01)

(56) References Cited

U.S. PATENT DOCUMENTS

| | | | |
|---|---|---|---|
| 7,876,455 B2 | 1/2011 | Kawasaki et al. | |
| 9,511,494 B2 | 12/2016 | Noh et al. | |
| 2002/0005778 A1* | 1/2002 | Breed | B60Q 9/008 |
| | | | 340/435 |
| 2005/0195383 A1* | 9/2005 | Breed | B60N 2/002 |
| | | | 356/4.01 |
| 2007/0019181 A1* | 1/2007 | Sinclair | G01C 3/08 |
| | | | 356/4.01 |
| 2009/0309710 A1 | 12/2009 | Kakinami | |
| 2013/0321627 A1* | 12/2013 | Turn, Jr. | B60W 30/00 |
| | | | 348/148 |
| 2014/0125813 A1* | 5/2014 | Holz | G06K 9/00375 |
| | | | 348/169 |
| 2014/0152823 A1* | 6/2014 | Breed | B60R 25/25 |
| | | | 348/148 |

* cited by examiner

AUGMENTED OBJECT DETECTION USING STRUCTURED LIGHT

RELATED APPLICATIONS

This application claims priority to U.S. Provisional Patent Application Ser. No. 62/075,350 filed Nov. 5, 2014, which is hereby incorporated by reference.

TECHNICAL FIELD

This invention relates to vehicle safety systems, and more particularly, to the use of structured light to augment an object detection system.

BACKGROUND OF THE INVENTION

Monocular camera systems are limited in their ability to represent three dimensional data in the camera's two-dimensional focal plane array. The camera's image of the world appears flat without any depth-of-field. The algorithmic techniques for recovering the lost depth-of-field are application dependent and work only within extremely narrow bounds—they are not globally robust. For example, structure from motion and temporal stereo matching can be used to reconstruct a depth image from a monocular camera with differential position. The camera must be moving with an inter-frame coherence and the movements must be tracked in real-world coordinates, usually with an inertial measurement unit. Other examples, such as dichromatic reflectance, Gouraud shading, and flat earth models require controlled scene illumination and a stationary camera position.

SUMMARY OF INVENTION

In accordance with an aspect of the invention, an object detection system is provided for detecting objects within a region of interest. A camera is configured to image a region of interest. A structured light source is configured to provide a substantially two-dimensional light curtain within a field of view of the camera formed by at least one projected laser beam at a wavelength detectable by the camera. An image analysis component is configured to detect objects within the region of interest from at least a position of the at least one projected laser beam within the image.

In accordance with another aspect of the invention, a method is provided for detecting objects within a region of interest. A substantially two-dimensional light curtain is projected into a region of interest. The region of interest is imaged at a camera to provide an image, such that an intersection of the substantially two-dimensional light curtain with the ground is visible. It is determined that an object is present if the intersection of the substantially two-dimensional light curtain with the ground deviates from an expected baseline.

In accordance with yet another aspect of the present invention, an object detection system is provided for detecting objects within one of a blind spot and a region rearward of a vehicle. A camera is configured to image the one of the blind spot and the region rearward of the vehicle. A structured light source, comprising a laser diode and a beam shaping optical component, is configured to provide a substantially two-dimensional light curtain within a field of view of the camera formed by at least one projected laser beam at a wavelength detectable by the camera. An image analysis component is configured to detect objects within the one of the blind spot and the region rearward of the vehicle from at least a position of the at least one projected laser beam within the image.

DETAILED DESCRIPTION

The inventor has determined that a monocular camera can be augmented with structured light to enhance the ability of the camera to detect and locate objects within the field of view. Specifically, one or more light curtains, that is, a continuous or intermittent two-dimensional shape formed by one or more projected laser beams, can be projected into the field of view of the camera. A deflection or deformation of these light curtains can be detected and quantified to determine the presence and location of an object within the field of view. In one implementation, multiple shapes can be used to define different ranges through which an object may extend. In another implementation, two or more non-parallel beams are used to provide a three-dimensional shape within the field of view to allow for a more precise determination of the location of the object.

Figure 1:
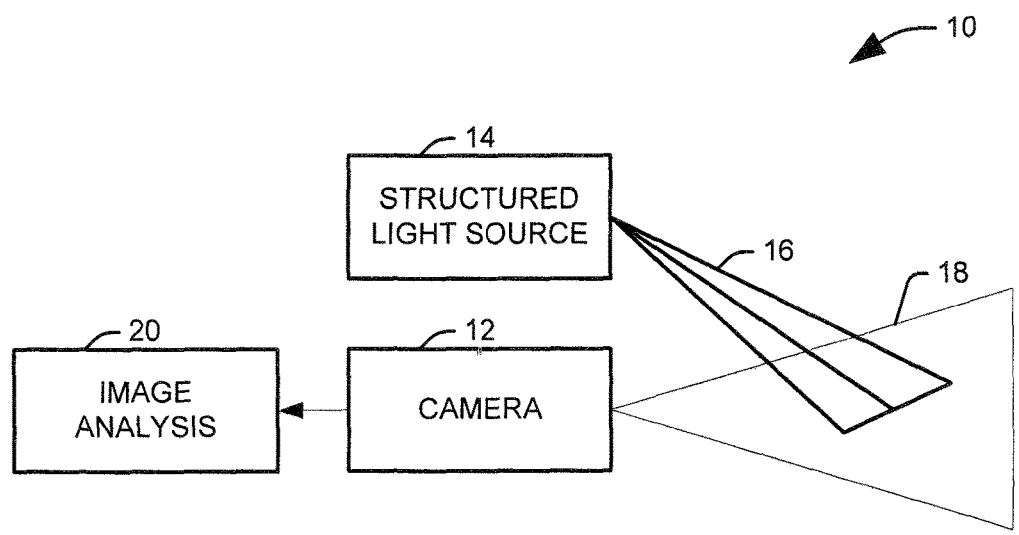
FIG. 1 illustrates one example of an object detection system for detecting objects within a region of interest.

FIG. 1 illustrates one example of an object detection system 10 for detecting objects within a region of interest. The system 10 includes a camera 12 configured to image the region of interest and a structured light source 14 configured to provide a two-dimensional shape 16 with a field of view 18 of the camera formed by at least one projected laser beam at a wavelength detectable by the camera. In one implementation, the camera is selected to image within the visible band and the laser operates around 532 nm.

An image analysis component 20 is configured to detect objects within the region of interest from at least a position of the at least one projected laser beam within the image, or more specifically, the location of an intersection with the beam and the ground. In one implementation, this detection can be accomplished by translating the camera image into a world coordinate domain and reviewing the line of intersection of the laser with reflective objects to determine if any objects are present. In one implementation, a point of intersection of two non-parallel lines can be used as a known reference point in the transformation. Alternatively, multiple parallel beams can be used, representing different distances from the vehicle, with the specific beams showing a deflection indicating a distance of the object from the vehicle.

Figure 2:
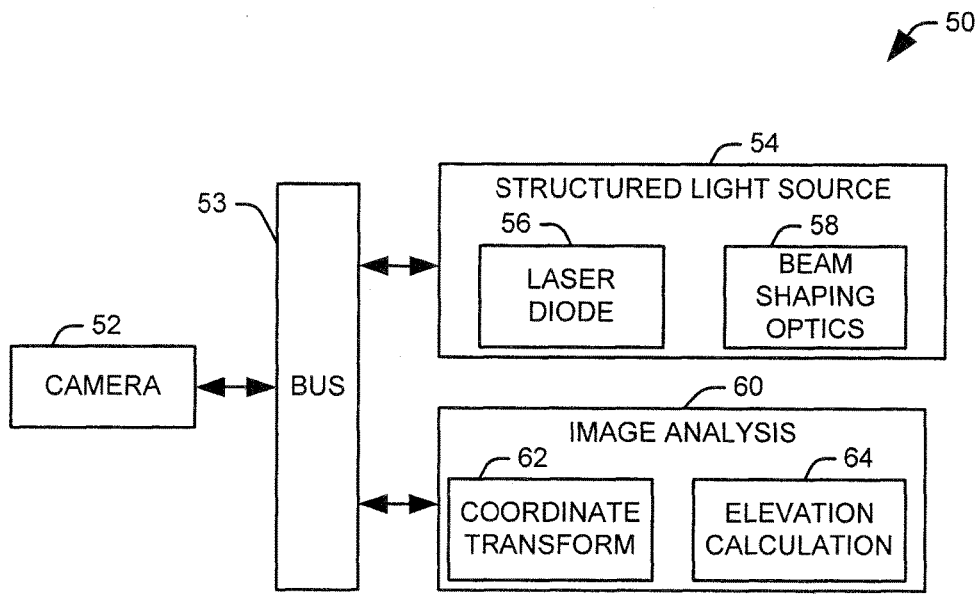
FIG. 2 illustrates an example of a system for detecting objects within one of a blind spot or a region rearward of the vehicle.

FIG. 2 illustrates an example of a system 50 for detecting objects within one of a blind spot or a region rearward of the vehicle, referred to herein as the region of interest. The system 50 includes a camera 52 configured to image the region of interest. In the illustrated implementation, the camera 52 is configured to detect incident light in the visible and near infrared domain. The camera 52 is positioned on the vehicle in a position to effectively image the region of interest. It will be appreciated that the camera 52 can be connected via a vehicle bus 53 to the other components of the system, 54 and 60.

A structured light source 54 is configured to provide a substantially two-dimensional light curtain passing into the region of interest. In the illustrated implementation, the structured light source 54 includes a laser diode 56 configured to provide at least one laser beam at a wavelength detectable by the camera 52 and a beam shaping optical component 58 configured to produce the substantially two-dimensional light curtain from the at least one laser beam. It will be appreciated that the laser diode 56 can provide light in any of the visible, infrared, and ultraviolet ranges. The beam shaper optical component 58 can include any of a diffractive diffuser, a diffractive beam shaper, or other appropriate optical component. In the illustrated implementation, the beam shaping optical component 58 can comprise a solid diffractive beamforming optic that produces the light curtain across an angle of forty-six degrees. Accordingly, it will be appreciated that the illustrated implementation functions with no moving components in the optics.

The structured light source 54 can be mounted at an appropriate location on the vehicle to project the light curtain into the region of interest. While the inventor has found that collocating the structured light source 54 and the camera 52 can lead to suboptimal results, the location of the structured light source 54 and the camera 52 can otherwise be selected to maximize the utility of the imaged region of interest given a geometry of the vehicle. In one implementation, each of the structured light source 54 and the camera 52 can be mounted to a top of the vehicle and separated by a horizontal baseline. In another implementation, the structured light source 54 and the camera 52 can be separated by a small vertical baseline.

It will be further appreciated that the structured light source 54 can be configured to provide additional light curtains into the region of interest. To this end, the beam shaping optical component 58 can be configured to provide a plurality of parallel light curtains. For example, each light curtain can be projected to intersect the ground at lines substantially parallel to a side of the vehicle on which the structured light source is mounted, with each light curtain intersecting the ground at a specified distance from the vehicle, assuming reasonably level ground at the point of intersection. Alternatively or additionally, the structured light source 54 can be configured to provide a light curtain that is substantially perpendicular to the one or more other light curtains, such that the light curtain intersects the ground in a line substantially perpendicular to the line or lines of the other light curtains. It will be appreciated that the additional light curtains can be provided by additional structured light sources (not shown) instead of providing multiple light curtains from a single component, as is illustrated in FIG. 2.

An image taken at the camera 52 is provided to an image analysis component 60 configured to determine if an object is present in the region of interest. It will be appreciated that the image analysis component 60 can be implemented as software operating on a microprocessor within the vehicle, as dedicated hardware, or as a combination of software and dedicated hardware. Specifically, the image analysis component 60 determines if one or more objects are present in the path of the light curtain from the captured image. The image analysis component 60 can be configured to rectify the image before analysis, if rectification is not performed on the image at the camera 52 or a related component (not shown), and that other image conditioning can be performed before analysis.

It will be appreciated that, in the absence of an object, the light curtains will form relatively straight lines upon intersecting the ground. In the presence of an object within the extent of the light curtain, however, the intersection of the light curtain with the object will have an elevation relative to the original baseline. In one implementation, multiple parallel light curtains can be used to define various regions near the vehicle. In this implementation, the distance of the object from the vehicle can be determined according to which light curtain or light curtains exhibit a deviation from the baseline.

In the illustrated implementation, two perpendicular light curtains can be used, such that their point of intersection represents a known reference point within the image. Using this reference point, a location and height of the object can be determined from the position, magnitude, and width of the deviation from the baseline elevation. To this end, the image analysis system 60 includes a coordinate transform component 62 configured to transform the location of each pixel within the image to a real world coordinate system around the vehicle. Specifically, for a pixel (x, y) within the image, where x represents a column in which the pixel is located and y is a row in which the pixel is located, a position (X, Z), where X represents a distance cross range of the camera and Z represents a distance downrange of the camera, is determined as:

$$X = \frac{Hx}{f_x \sin(\phi) - y\cos(\phi)}, Z = \frac{H[f_y \cos(\phi) + y\sin(\phi)]}{f_x \sin(\phi) - y\cos(\phi)} \qquad \text{Eq. 1}$$

where $f_x$ is a horizontal focal length of the camera, $f_y$ is a vertical focal length of the camera, $\phi$ is a camera pitch angle, and H is a camera height.

Where objects have been detected, an elevation calculation component 64 can determine an elevation of the object from the image and the determined location. Specifically, an elevation, Y, at a given location can be determined from its distance, Z, downrange of the camera and a row, y, in which the pixel representing the location is located as:

$$Y = \frac{Z[y\cos(\phi) - f_y \sin(\phi)]}{y\sin(\phi) + f_y \cos(\phi)} + H \qquad \text{Eq. 2}$$

where $f_y$ is a vertical focal length of the camera, $\phi$ is a camera pitch angle, and H is a camera height.

Once the position and elevation of the object have been determined, this information can be provided to the user via appropriate audible, visible, or tactile feedback. In one implementation, the object can be highlighted in a display of a rear view or a side view of the vehicle presented to the operator on a display within the vehicle.

Figure 3:
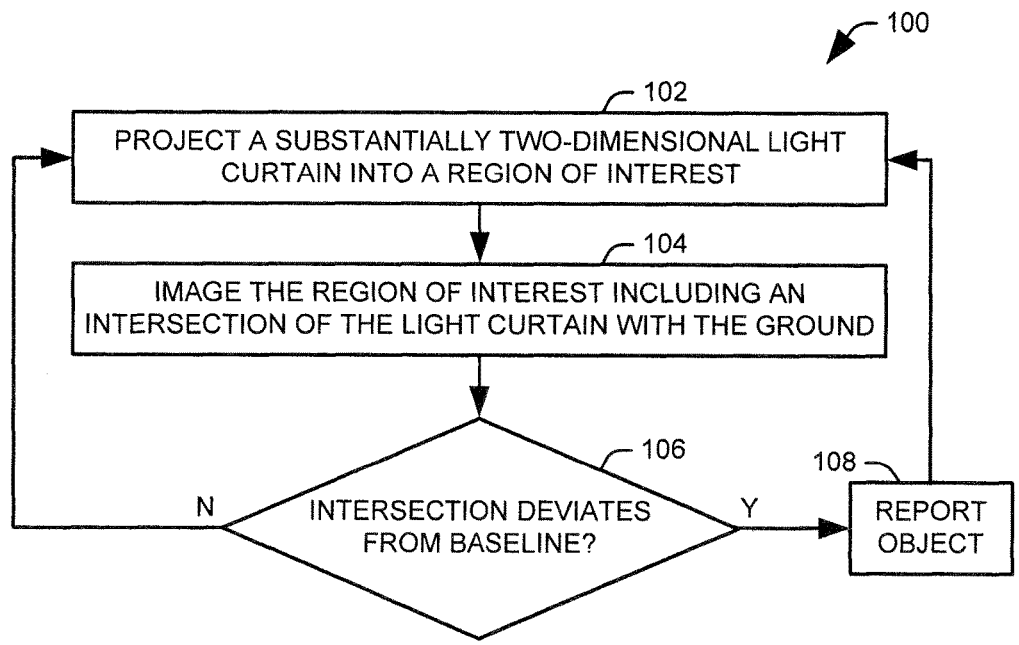
FIG. 3 illustrates a method for detecting objects within a region of interest.

In view of the foregoing structural and functional features described above, a method in accordance with various aspects of the present invention will be better appreciated with reference to FIG. 3. While, for purposes of simplicity of explanation, the method of FIG. 3 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect the present invention.

FIG. 3 illustrates a method 100 for detecting objects within a region of interest. At 102, a substantially two-dimensional light curtain is projected into a region of interest. The region of interest can be selected, for example, a blind spot or a region rearward of the vehicle. It will be appreciated that the light curtain can be formed from visible, infrared, or ultraviolet light. In one implementation, multiple light curtains can be projected into the region of interest. For example, the additional light curtains can be parallel or perpendicular to the first light curtain, depending on the application At 104, the region of interest is imaged at a camera to provide an image, such that an intersection of the substantially two-dimensional light curtain with the ground is visible. It will be appreciated that the camera can be fitted with appropriate filters for detecting the light associated with the light curtain. At 106, it is determined if the intersection of the substantially two-dimensional light curtain with the ground deviates from an expected baseline. If so (Y), it is reported that an object has been detected at 108 and the method returns to 102 to continue evaluation of the region of interest. If not (N), the method returns to 102 to continue evaluation of the region of interest.

In one implementation, the image can be used to determine additional information about an object detected with the region of interest. In one implementation, multiple parallel light curtains can be used, an the object can be determined to be at a first distance if a line formed by the intersection of a first substantially two-dimensional light curtain and the ground deviates from a first expected baseline or at a second distance if a line formed by the intersection of a second substantially two-dimensional light curtain and the ground deviates from a second expected baseline. It will be appreciated that more than two parallel curtains can be used in this manner to increase the resolution of the distance determination. Alternatively, perpendicular light curtains can be projected, and the image subjected to a coordinate transform to determine the location and elevation of any detected objects, for example, as described in Eqs. 1 and 2 above.

Figure 4:
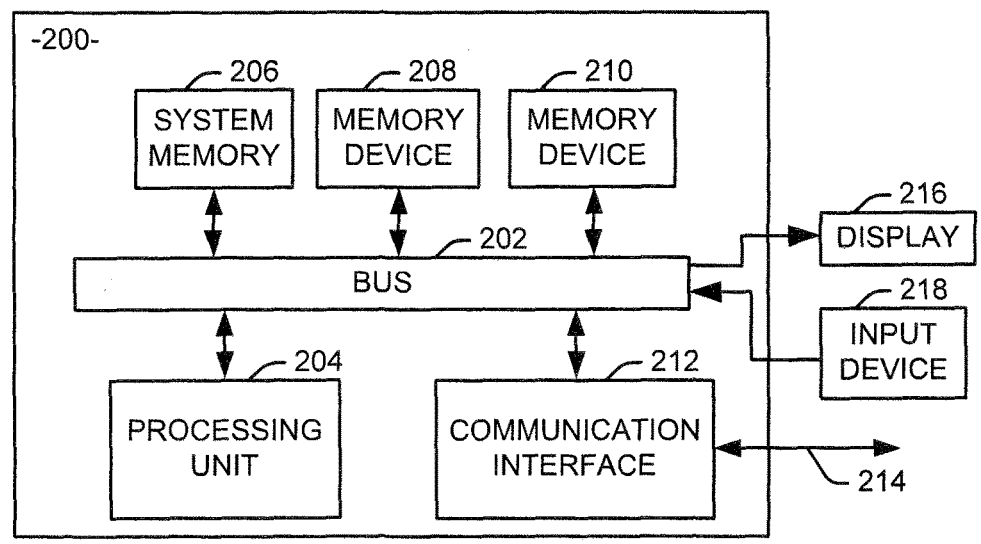
FIG. 4 is a schematic block diagram illustrating an exemplary system of hardware components capable of implementing examples of the systems and methods disclosed herein.

FIG. 4 is a schematic block diagram illustrating an exemplary control system 200 of hardware components capable of implementing examples of the systems and methods disclosed herein, such as the object detection system described previously. The system 200 can include various systems and subsystems. The system 200 can be implemented using a vehicle-based controller connected via a vehicle bus or by using an image analysis controller. The computer could include a microcomputer or the desired control functions could be achieved using an application-specific integrated circuit (ASIC) arranged accordingly.

The control system 200 can include a system bus 202, a processing unit 204, a system memory 206, memory devices 208 and 210, a communication interface 212 (e.g., a network interface), a communication link 214, a display 216, and an input devices 218 (e.g., acceleration sensors, camera inputs, etc.). The system bus 202 can be in communication with the processing unit 204 and the system memory 206. The additional memory devices 208 and 210 can also be in communication with the system bus 202. The system bus 202 interconnects the processing unit 204, the memory devices 206-210, the communication interface 212, the display 216, and the input devices 218. In some examples, the system bus 202 also interconnects an additional port (not shown).

The processing unit 204 can be a microcomputer and/or can include an application-specific integrated circuit (ASIC) arranged to perform the desired processing and control functions. The processing unit 204 executes a set of instructions to implement the operations of examples disclosed herein.

The additional memory devices 206, 208 and 210 can store data, programs, instructions, database queries in text or compiled form, and any other information that can be needed to operate a computer. The memories 206, 208 and 210 can be implemented as computer-readable media.

Additionally or alternatively, the system 200 can access an external data source or query source through the communication interface 212, which can communicate with the system bus 202 and the communication link 214.

In operation, the processing unit 204 executes one or more computer executable instructions originating from the system memory 206 and the memory devices 208 and 210. The term "computer readable medium" as used herein refers to a medium that participates in providing instructions to the processing unit 204 for execution.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. An object detection system for detecting objects within a region of interest, comprising:
  a camera configured to image a region of interest to provide an image;
  a structured light source configured to provide a first two-dimensional light curtain and a second two-dimensional light curtain that is perpendicular to the first two-dimensional light curtain within a field of view of the camera, such that point of intersection of the first two-dimensional light curtain and the second two-dimensional light curtain represents a known reference point within the image, each of the first two-dimensional light curtain and a second two-dimensional light curtain being formed by at least one projected laser beam at a wavelength detectable by the camera; and
  an image analysis component configured to detect objects within the region of interest from at least a position of the first two-dimensional light curtain within the image using the position of the point of intersection within the image as the known reference point to transform the position of the first two-dimensional light curtain in the image to a real world coordinate domain.

2. The object detection system of claim 1, wherein the structured light source comprises a laser diode and a beam shaping optical component configured to produce the two-dimensional light curtain.

3. The object detection system of claim 2, the laser diode being configured as to produce light within the infrared band.

4. The object detection system of claim 1, wherein the camera is mounted to a vehicle at a first location and the structured light source is mounted to the vehicle at a second location, spatially remote from the first location.

5. The object detection system of claim 1, wherein the image analysis system is configured to evaluate an intersection of the two-dimensional light curtain with the ground within the image, with the presence of an object being indicated by a deviation of a line formed by the intersection from an expected baseline.

6. The object detection system of claim 1, the structured light source being further configured to provide a third two-dimensional light curtain within the field of view of the camera, the third two-dimensional light curtain being parallel to the first two-dimensional light curtain.

7. The object detection system of claim 6, wherein the image analysis component is configured to evaluate respective intersections of each of the first two-dimensional light curtain and the third two-dimensional light curtain with the ground within the image, with the presence of an object at a first distance being indicated by a deviation of a line formed by the intersection of the first two-dimensional light curtain and the ground from a first expected baseline and the presence of an object at a second distance being indicated by a deviation of a line formed by the intersection of the third two-dimensional light curtain and the ground from a second expected baseline.

8. The object detection system of claim 1, wherein the structured light source is configured to have a dispersion angle between forty degrees and fifty degrees.

9. The object detection system of claim 1, the image analysis component comprising a coordinate transform component configured to apply a coordinate transform to the image, such that for each pixel (x, y) within the image, where x represents a column in which the pixel is located and y is a row in which the pixel is located, a position (X, Z), where X represents a distance cross range of the camera and Z represents a distance downrange of the camera, is determined as $$X = \frac{Hx}{f_x \sin(\phi) - y\cos(\phi)} \text{ and } Z = \frac{H[f_y \cos(\phi) + y\sin(\phi)]}{f_x \sin(\phi) - y\cos(\phi)},$$

where $f_x$ is a horizontal focal length of the camera, $f_y$ is a vertical focal length of the camera, $\phi$ is a camera pitch angle, and H is a camera height.

10. The object detection system of claim 1, the object detection system comprising an elevation calculation component configured to determine an elevation, Y, at a given location from its distance, Z, downrange of the camera and a row, y, in which the pixel representing the location is located as $$Y = \frac{Z[y\cos(\phi) - f_y \sin(\phi)]}{y\sin(\phi) + f_y \cos(\phi)} + H$$

where $f_y$ is a vertical focal length of the camera, $\phi$ is a camera pitch angle, and H is a camera height.

11. A method for detecting objects within a region of interest, comprising:
projecting a first two-dimensional light curtain into a region of interest;
projecting a second two-dimensional light curtain into the field of view of the camera that is perpendicular to the first two-dimensional light curtain such that point of intersection of the first two-dimensional light curtain and the second two-dimensional light curtain represents a known reference point within the image;
imaging the region of interest at a camera to provide an image, such that an intersection of the at least one of the first two-dimensional light curtain and a second two-dimensional light curtain with the ground is visible; and
determining that an object is present from a deviation of an intersection of the two-dimensional light curtain with the ground from an expected baseline and a position of the point of intersection within the image.

12. The method of claim 11, further comprising projecting a third two-dimensional light curtain into the region of interest, with the third two-dimensional light curtain being parallel to the first two-dimensional light curtain.

13. The method of claim 12, wherein determining that the object is present comprising determining the presence of the object at a first distance if a line formed by the intersection of the first two-dimensional light curtain and the ground deviates from a first expected baseline and determining the presence of an object at a second distance if a line formed by the intersection of the third two-dimensional light curtain and the ground deviates from a second expected baseline.

14. The method of claim 11, further comprising applying a coordinate transform to the image, such that for each pixel (x, y) within the image, where x represents a column in which the pixel is located and y is a row in which the pixel is located, a position (X, Z), where X represents a distance cross range of the camera and Z represents a distance downrange of the camera, is determined as $$X = \frac{Hx}{f_x \sin(\phi) - y\cos(\phi)} \text{ and } Z = \frac{H[f_y \cos(\phi) + y\sin(\phi)]}{f_x \sin(\phi) - y\cos(\phi)},$$

where $f_x$ is a horizontal focal length of the camera, $f_y$ is a vertical focal length of the camera, $\phi$ is a camera pitch angle, and H is a camera height.

15. The method of claim 14, further comprising determining an elevation, Y, at a given location from its distance, Z, downrange of the camera and a row, y, in which the pixel representing the location is located as $$Y = \frac{Z[y\cos(\phi) - f_y \sin(\phi)]}{y\sin(\phi) + f_y \cos(\phi)} + H$$

where $f_y$ is a vertical focal length of the camera, $\phi$ is a camera pitch angle, and H is a camera height.

16. An object detection system for detecting objects within one of a blind spot and a region rearward of a vehicle, comprising:
a camera configured to image the one of the blind spot and the region rearward of the vehicle;
a structured light source, comprising a laser diode and a beam shaping optical component, configured to provide a first two-dimensional light curtain and a second two-dimensional light curtain that is perpendicular to the first two-dimensional light curtain within a field of view of the camera, such that point of intersection of the first two-dimensional light curtain and the second two-dimensional light curtain represents a known reference point within the image, each of the first two-dimensional light curtain and a second two-dimensional light curtain being formed by at least one projected laser beam at a wavelength detectable by the camera; and an image analysis component configured to detect objects within the one of the blind spot and the region rearward of the vehicle from at least a position of the at least one projected laser beam within the image and a position of the point of intersection within the image by applying a coordinate transform to the image, such that for each pixel (x, y) within the image, where x represents a column in which the pixel is located and y is a row in which the pixel is located, the position where X represents a distance cross range of the camera and Z represents a distance downrange of the camera, is determined as $$X = \frac{Hx}{f_x \sin(\phi) - y\cos(\phi)} \text{ and } Z = \frac{H[f_y\cos(\phi) + y\sin(\phi)]}{f_x \sin(\phi) - y\cos(\phi)},$$

where $f_x$ is a horizontal focal length of the camera, $f_y$ is a vertical focal length of the camera, $\phi$ is a camera pitch angle, and H is a camera height.

17. The object detection system of claim 16, wherein the camera is mounted to a vehicle at a first location and the structured light source is mounted to the vehicle at a second location, spatially remote from the first location.

18. The object detection system of claim 16, wherein the image analysis system is configured to evaluate an intersection of the two-dimensional light curtain with the ground within the image, with the presence of an object being indicated by a deviation of a line formed by the intersection from an expected baseline.

\* \* \* \* \*